Figure 1:
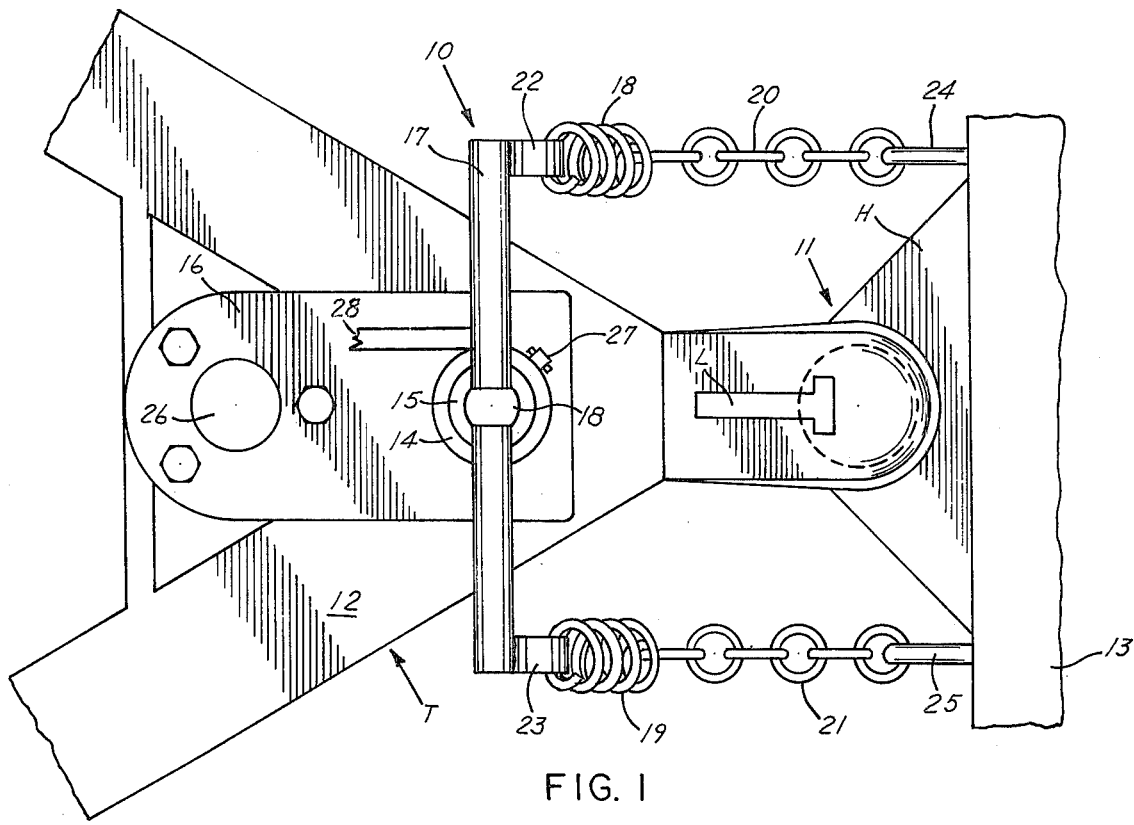

United States Patent [19]
Campbell

[11] 3,884,504
[45] May 20, 1975

[54] SLACK ADJUSTER HITCH FOR MOTOR VEHICLES

[76] Inventor: Eldo L. Campbell, 540 Fifth St., Bennett, Colo. 80102

[22] Filed: Sept. 20, 1973

[21] Appl. No.: 398,942

[52] U.S. Cl. ......... 280/446 R; 280/446 B; 280/489
[51] Int. Cl. ............................................. B60d 1/12
[58] Field of Search ........... 280/446 R, 446 B, 489, 280/406, 488, 457, 150.5

[56] References Cited
UNITED STATES PATENTS

| | | | |
|---|---|---|---|
| 2,793,878 | 5/1957 | Toland | 280/406 A |
| 3,471,170 | 10/1969 | Rendessy | 280/446 B |
| 3,542,395 | 11/1970 | Millikan | 280/406 A |

Primary Examiner—David Schonberg
Assistant Examiner—R. Schrecengost

[57] ABSTRACT

The vertical stability and longitudinal slack adjustment of a towed vehicle relative to a towing vehicle is improved by attaching to the tongue of the towed vehicle a vertically extending hydraulic piston assembly having a lateral cross arm lever member secured to the piston and spring-loaded connecting members attached between the ends of the cross member and the towing vehicle. Tension is applied to the spring-loaded connecting members by elevating the piston thereby to remove any slack between the vehicles while permitting one to turn relative to the other.

7 Claims, 2 Drawing Figures

PATENTED MAY 20 1975 3,884,504

SLACK ADJUSTER HITCH FOR MOTOR VEHICLES

This invention relates to stabilizing devices for towed vehicles and more particularly relates to a novel and improved slack adjuster hitch for trailers.

The connection of lightweight trailers such as boat trailers, horse trailers, small camper trailers and various utility trailers to a towing vehicle by means of a hitch or coupler which permits pivotal movement of the vehicles relative to each other is a common practice. Various types of devices have been proposed for stabilizing the lateral movement or sway of trailing vehicles with respect to the towing vehicle. While the common ball and socket hitch or coupler permits substantial lateral movement of the towed vehicle, it also permits limited vertical movement of the trailing vehicle which may result in undesirable tipping of the towed vehicle during travel. This tipping action is more pronounced in trailers having a relatively high center of gravity, such as, often occurs with a loaded horse trailer. Thus the tipping action relative to the towing vehicle can be dangerous in that a great deal of torsional stress can be placed on the hitching or coupling mechanism. If this torsional stress becomes too great the coupler may fail or disconnect.

The ball and socket type hitching mechanism customarily allows some longitudinal movement of the towed vehicle with respect to the towing vehicle. This type of movement is generally referred to as "slack" which is exhibited in back and forth relative shifting movement of the trailer with respect to the towing vehicle.

It is therefore an object of the present invention to provide for a novel and improved stabilizer which is readily conformable for use with various types of hitches or couplers interconnecting a trailer and towing vehicle and which is operative to maintain vertical stability of the trailer with respect to the towing vehicle as well as to reduce torsional strain on the hitch or coupler mechanism.

It is a further object of the present invention to provide for a vertically adjustable slack adjuster apparatus which is specifically adaptable for use between a towed and towing vehicle in such a way as to minimize any slack in the coupling mechanism therebetween and to stabilize the towed vehicle against sway with respect to the towing vehicle while permitting either vehicle to turn with respect to the other.

Another object of the present invention is to provide for a novel and improved stabilizer apparatus which is adaptable for use with conventional ball and socket coupling mechanisms to minimize relative longitudinal displacement or "slack" between a towed and towing vehicle in a reliable and dependable manner.

In accordance with the present invention, a stabilizer apparatus has been devised for use between a towed vehicle and towing vehicle in which a vertically adjustable force-applying member, which preferably takes the form of a hydraulic cylinder and piston assembly, is mounted on the coupling member or tongue of the towed vehicle and has a suitable valve control associated therewith to regulate the extent of upward vertical movement of the piston with respect to the cylinder. An elongated cross member is secured to the upper end of the piston and has attaching members at opposite ends for connection of the rearward ends of a pair of flexible connectors which extend forwardly from the cross member for connection in spaced relation to the towing vehicle on opposite sides of the hitch of the towing vehicle. When the piston is retracted in the cylinder the flexible connector members are of a length such that they can be loosely attached between the cross member and the towing vehicle; and as the piston is extended outwardly through the cylinder will reduce and substantially remove all slack in the connector members. Preferably, this occurs at an angle of 45° of the connector members with respect to horizontal so that the connectors can be tightly stretched between the cross members and towing vehicle while not interfering with turning of one vehicle with respect to the other, for example, in rounding curves or turning corners.

Figure 2:
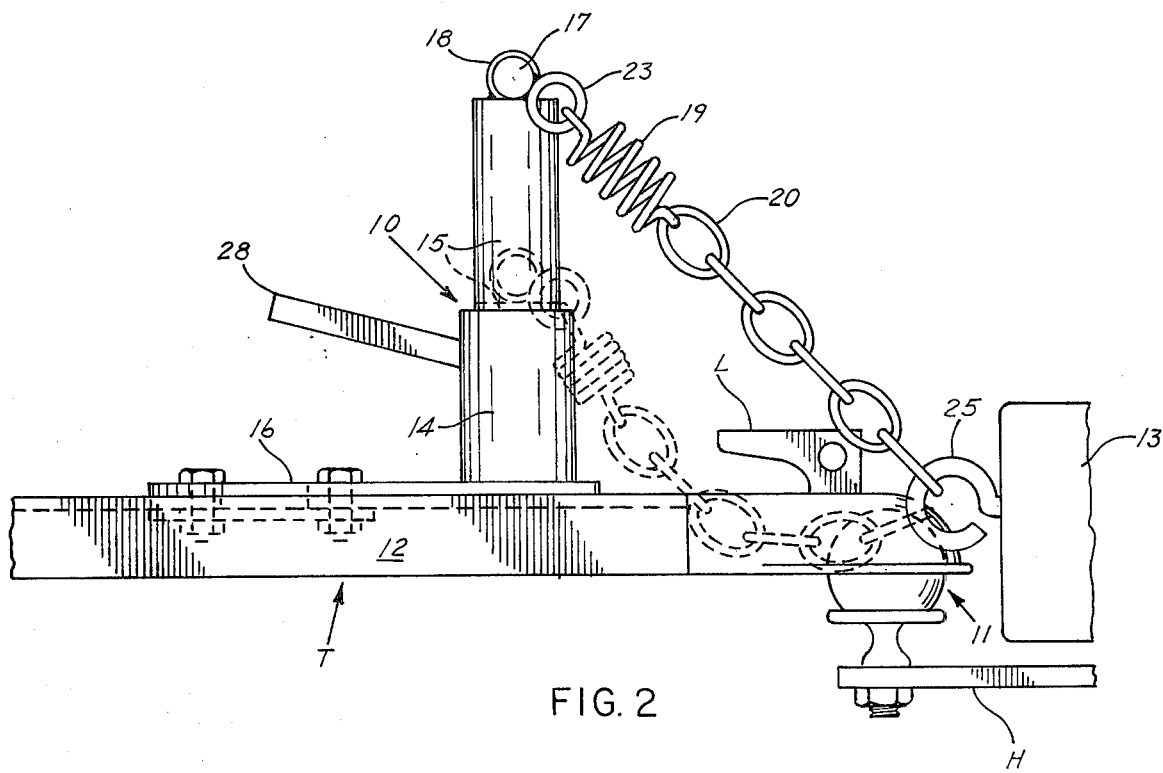

The above and other objects, advantages and features of the present invention will become more readily appreciated and understood from a consideration of the following detailed description when taken together with the accompanying drawings, in which:

FIG. 1 is a top plan view of the preferred form of stabilizer apparatus secured to the towing structure of the trailer and attached to the towing vehicle in combination with a conventional ball and socket coupling mechanism; and FIG. 2 is a side elevation view of the device shown in FIG. 1 in its operative position. The phantom lines show the device in its retracted inoperative position.

Referring in detail to the drawings, there is illustrated in FIGS. 1 and 2 a preferred form of stabilizer generally designated 10 which is mounted between the forwardly extending tongue T of a towed vehicle, not shown, and the trailer hitch H on the rear end of the towing vehicle, the rear bumper of the towing vehicle being represented at 13. A conventional ball and socket coupler mechanism is represented at 11 including a suitable cam lock L at the forward extremity of a pair of forwardly converging draw bars 12 which comprise the tongue T, all in accordance with conventional practice.

The stabilizer 10 in accordance with the present invention is comprised of a conventional hydraulically operated lift jack having a hydraulic cylinder 14 and piston 15 extending upwardly through the cylinder 14, the cylinder 14 being mounted on a base plate 16 for upward vertical extension from the tongue T of the towed vehicle. An elongated cross member preferably in the form of a cylindrical rod 17 is connected in swivelled relation to the upper extremity of the piston 15 by a sleeve member 18. In this manner, the rod 17 is free to rotate about its longitudinal axis with respect to the piston for a purpose to be described. As a suitable alternative however the rod 17 may be welded to the upper end of the piston 15.

Preferably the rod 17 is maintained in a position parallel to the bumper 13 of the towing vehicle by a pair of flexible connecting members attached to opposite ends of the rods 17. The flexible connector member on one end of the rod is made up of a tension spring 18 and a chain 20; and the flexible connecting member at the opposite end is made up of a tension spring 19 affixed to the end of a chain 21. Each of the springs 18 and 19 preferably is secured to the opposite ends of the rod 17 by free ends which are releasably hooked to eyelets 22 and 23, respectively, extending forwardly from opposite ends of the rod 17. In turn, the chains 20 and 21 have links at their forward ends which are removably secured by means of eyebolts 24 and 25, respectively, fastened to the bumper 13.

As illustrated in dotted line form in FIG. 2, when the piston 15 is in its retracted position, the flexible connecting members as described will hang loosely between the eyelets 22 and 23 on the cross rod 17 and the eyebolts 24 and 25 on the rear bumper 13. The piston 15 is driven upwardly through the cylinder under the control of a stroke handle 28 until the cross rod 17 reaches the desired height. A control valve 27 in the wall of the cylinder 14 is provided to release the hydraulic fluid pressure in lowering the piston 15 to the retracted position. Typically, the hydraulic lift jack assembly may be of the type disclosed in U.S. Pat. Nos. 2,527,428 to Kemerer, or 2,170,029 to Liddell et al. Again as the hydraulic fluid pressure is increased in the cylinder, the piston 15 and cross member 17 are raised until the slack is removed from the chains 20 and 21 and the connected springs 18 and 19 are placed under the desired tension. As tension is placed on the springs 18 and 19, the socket portion of the coupling 11 which forms a forward extension of the tongue T is urged downwardly over the ball on the trailer hitch H and the coupling members between the towed and towing vehicles as described are yieldingly but firmly held together. Most desirably, the necessary tension is placed in the springs 18 and 19 when the flexible connecting members are extended to an angle on the order of 45° to the horizontal so that any slack between the coupling members is removed while permitting one vehicle to turn with respect to the other. Moreover, arrangement of the flexible connecting members at 45° will effectively minimize any tendency of the towed vehicle to sway or tip with respect to the towing vehicle. It will be noted further that as the piston is extended upwardly through the cylinder the eyelets 22 and 23 are free to rotate with the cross rod 17 about the sleeve 18 so as not to place undue strain on the rod. Of course, the rod 17 may be permanently affixed to the upper end of the piston 15, as stated earlier, in which event the ends of the springs hooked within the eyelets 22 and 23 will be free to slide to a limited extent along the inner surfaces of the eyelets as the angle between the flexible connecting members and cross rod is varied.

The cross rod 17 is also free to rotate with the piston 15 about the vertical center axis of the piston 16 so that the cross rod 17 will remain parallel to the bumper 13 of the towing vehicle, for example, in turning corners and thereby maintain substantially constant tension in the springs. In the event that the towed vehicle should tend to tip or sway more than the trailing vehicle, in rounding curves, of course the tension on one spring may be increased more than on the other thereby imparting a downward thrust to one side of the cross rod 17. The increased tension of the spring on that side will be imparted in turn to the same side of the towed vehicle through the cylinder 14 and tongue T so as to minimize any such tendency of the towed vehicle to sway or tip.

In practice, the length of the cross rod 17 may be suitably varied in accordance with the size or width of the towed vehicle, a longer cross rod being utilized for larger or wider vehicles. Needless to say, the flexible connecting members should be carefully matched to be of the same length and size and the spring constant of the springs 18 and 19 should also be carefully matched so as to impart substantially equal tension to the ends of the cross rod 17 when placed in the operative position. For the purpose of illustration and not limitation, and depending upon the weight and size of the trailer or towed vehicle, 500 to 1000 lb. tension springs are satisfactory for most small trailers. The overall length of the flexible connecting members including the springs 18 and 19 and the chains 20 and 21 are dictated by the distance between the cross rods 17 and bumper 13 so that when the piston 15 is in its retracted position, the connecting members may be loosely secured between the rear bumper and cross rod 17 so as to facilitate ready attachment of the ball and socket mechanism. However, when the piston is extended, any slack will be removed from the connecting members and the springs will be placed under some tension at an angle of approximately 45° in drawing the coupling mechanism 11 together.

It will be evident that the cylinder assembly may be affixed to the tongue T or other coupling member of the towed vehicle in various suitable ways. Preferably, the base plate 16 is permanently affixed to the tongue T by bolts 16' which extend into a trailer screw jack, not shown, inserted into the opening 26 of the tongue T in a conventional manner.

Suitable modifications may be made in the particular form of force-applying means in place of the hydraulic cylinder and piston assembly which will permit ready vertical adjustment of the cross member or rod 17 to the desired height to remove the slack from the coupling members between the vehicles by imparting sufficient tension to the springs 18 and 19. In this connection, it will be apparent that high strength cables or ropes could be employed in place of the chains 20 and 21. However, the flexible connecting members as defined should extend in spaced-apart relation from opposite ends of the cross rod and most desirably are either substantially parallel to one another or converge forwardly toward their points of attachment with the rear bumper 13.

It is therefore to be understood from the foregoing that the above and other modifications and changes may be made in the invention without departing from the spirit and scope thereof as defined by the appended claims.

What is claimed is:

1. Stabilizer apparatus adapted for reducing slack between a towed vehicle and a towing vehicle comprising in combination:

a first coupling member extending forwardly from the towed vehicle and a second coupling member extending rearwardly from the towing vehicle for releasable interconnection with said first coupling member, vertically adjustable lift jack means extending vertically from said first coupling member including control means to vertically adjust between a retracted and extended position, a cross member connected to one end of said lift jack means opposite to its connection to said first coupling member and extending in a direction transversely of the length of said vehicles, said cross member having attaching means at opposite ends thereof; and a pair of flexible connector means secured at their rearward ends to opposite ends of said cross member and at their forward ends to the towing vehicle in laterally spaced-apart relationship to one another whereby vertical extension of said lift jack means by said control means is operative to remove any slack in said flexible connector means and between said first and second coupling members.

2. A stabilizer apparatus according to claim 1 wherein each of said flexible connector means is spring-loaded and is placed under tension by vertical extension of said lift jack means.

3. A stabilizer apparatus according to claim 1 wherein said cross member is pivotally connected to the end of said lift jack means.

4. A stabilizer apparatus according to claim 1, said lift jack means including a hydraulic cylinder and piston extending upwardly through said cylinder, said cross member being secured to the upper end of said piston.

5. A stabilizer apparatus adapted for interconnection between a trailer and towing vehicle wherein the trailer is provided with a coupling member extending forwardly for releasable connection to a trailer hitch extending rearwardly from the towing vehicle, said stabilizer apparatus comprising in combination:

lift jack means mounted on said first coupling member for upward vertical extension including a cylinder affixed to said coupling member and a piston projecting upwardly from said cylinder and control means to selectively control fluid under pressure applied to said cylinder for vertical adjustment of said piston with respect to said cylinder, an elongated cross member of generally circular cross section swivelled at its midpoint to the upper end of said piston for rotational movement about its longitudinal axis and having attaching means at opposite ends thereof, and a pair of flexible connector members secured at their rearward ends to the opposite ends of said cross member and at their forward ends to said towing vehicle on opposite sides of said trailer hitch, said connector members including tension springs thereon, and said connector members being of a length to loosely extend between said cross member and towing vehicle when said piston is in its retracted position and to be stretched between said cross member and towing vehicle with said tension springs held under tension when said piston is advanced to its extended position.

6. A stabilizer apparatus according to claim 5, said flexible connector means being attached to the towing vehicle at two points symmetrically located with respect to the longitudinal axis of said towing vehicle on opposite sides of said trailer hitch.

7. A stabilizer apparatus according to claim 6, said attachment means for said cross member being defined by eyelets extending forwardly from said cross member toward the towing vehicle.

* * * * *